(12) United States Patent
Nishimura et al.

(10) Patent No.: US 7,540,633 B2
(45) Date of Patent: Jun. 2, 2009

(54) LAMP UNIT AND PROJECTION DISPLAY APPARATUS

(75) Inventors: Yoshifumi Nishimura, Tokyo (JP); Hiroaki Takamatsu, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 93 days.

(21) Appl. No.: 11/391,269

(22) Filed: Mar. 29, 2006

(65) Prior Publication Data
US 2006/0227555 A1    Oct. 12, 2006

(30) Foreign Application Priority Data
Apr. 6, 2005  (JP) .............................. 2005-109910

(51) Int. Cl.
*F21V 29/00*    (2006.01)
(52) U.S. Cl. .................. 362/294; 362/218; 362/373; 362/547; 353/57; 353/61
(58) Field of Classification Search .......... 362/218, 362/264, 268, 294, 345, 373, 547; 353/57, 353/61; 361/690–695; 174/16.1, 16.5; 165/80.3, 165/104.33; 454/184
See application file for complete search history.

(56) References Cited

U.S. PATENT DOCUMENTS

| 6,568,611 | B1 * | 5/2003 | Essenmacher | 239/589 |
| 2002/0044455 | A1 * | 4/2002 | Ozawa et al. | 362/547 |
| 2004/0145896 | A1 | 7/2004 | Watanabe et al. | |
| 2004/0228130 | A1 * | 11/2004 | Kato et al. | 362/294 |

FOREIGN PATENT DOCUMENTS

| JP | 8-22075 | 1/1996 |
| JP | 10-197953 | 7/1998 |
| JP | 11-354963 | 12/1999 |
| JP | 2000-35614 | 2/2000 |
| JP | 2000-352762 | 12/2000 |
| JP | 2001-142147 | 5/2001 |
| JP | 2002-189247 | 7/2002 |
| JP | 2002-298639 | 10/2002 |
| JP | 2003-5292 | 1/2003 |
| JP | 2003-29337 | 1/2003 |
| JP | 2003-187629 | 7/2003 |
| JP | 2003-346547 | 12/2003 |
| JP | 2005-017458 | 1/2005 |
| JP | 2005-62452 | 3/2005 |

* cited by examiner

*Primary Examiner*—Sharon E Payne
*Assistant Examiner*—Mary Zettl
(74) *Attorney, Agent, or Firm*—McGinn IP Law Group, PLLC (57) ABSTRACT

In lamp unit 10 having light source lamp 1, reflector 2 for reflecting light from light source lamp 1, reflector holding member 11, and reflector cover 15, a plurality of cooling holes 18a are formed in a region of reflector holding member 11 provided with lamp unit positioner 16a. Cooling holes 18a are open toward an upper bulb area, a lower bulb area, and a cathode of the light source lamp, respectively. Stud 22a for fixing reflector holding member 11 has a throughhole extending at the center thereof, so that cooling air fed from high static pressure blower 27 can be sent to cooling holes 18 through tube 28 and the throughhole of stud 22a, thus efficiently cooling the upper bulb area, lower bulb area, and cathode of light source lamp 1 in a concentrative manner with a small amount of air. Thus, the resulting lamp unit, provided by the present invention, can reduce the amount of air required for cooling the lamp, and can use a high static pressure and small fan.

14 Claims, 8 Drawing Sheets

LAMP UNIT AND PROJECTION DISPLAY APPARATUS

BACKGROUND OF THE INVENTION

1. Field of the Invention

The present invention relates to a lamp unit which comprises a light source unit for use in optical devices and the like, and a projection display apparatus which comprises the lamp unit, and more particularly, to a lamp unit which restrains noise generated by a cooling fan, and a projection display apparatus which is reduced in size and noise.

2. Description of the Related Art

Electric home appliances and the like are required be silent, so that a variety of technologies have been developed for reducing the generation of noise. This tendency goes beyond electric home appliances and is spreading to general electronic devices. In particular, for devices associated with personal computers, quiet operation is required not only for a magnetic disk drive, a CPU cooling unit, and a power supply cooling unit, which are components of a personal computer, but also for a projection display apparatus and the like which are connected to the personal computer for use therewith.

A projection display apparatus has a light source unit which acts as a particularly large heat source, and must therefore be cooled down in order to ensure its performance and reliability. Cooling methods for use with the projection display apparatus can be roughly classified into air cooling and liquid cooling (including water cooling). For air-cooling electronic devices, air cooling methods for use therewith can be sub-divided into natural air cooling and forced air cooling. The forced air cooling involves the use of a variety of fans for forcedly exposing objects that are being cooled to air, or for exhausting air heated within the device. Since this cooling fan generates noise, an attempt to enhance cooling capabilities of an electronic device can result in a problem of noisiness caused by noise generated from the cooling fan. This tendency is prominent in electronic devices equipped with large heat sources, and becomes more prominent as the device itself become smaller. The problem for a projection display device is the issue of how to reconcile a reduction in size with a reduction in noise which increases because of cooling mechanisms that are included in such devices in order to improve performance.

Generally, a plurality of axial flow fans have been used for cooling a projection display apparatus. For example, a projection display apparatus using a liquid crystal display device requires a fan for taking in cooling air from the outside to the liquid crystal display device through an air filter, and a fan for exhausting heated air within the apparatus. Also, in some cases, another auxiliary fan has been used. Due to such a structure, the exhaust fan is generally placed near the component that is heated to high temperatures.

JP-A-11-354963 discloses a projection display apparatus which does not use axial flow fans but comprises a multiblade fan and a cooling duct, and is cooled by a cooling method which excels in maintenanceability and usability, where cooling air from an area that is being cooled flows through the cooling duct in a direction in which the cooling air is sucked into the multiblade fan and exhausted out of the apparatus from an exhaust port provided through a front panel of the apparatus. Thus, the axial flow fan and multiblade fan are used for cooling fans. Generally, the multiblade fan as compared with the axial flow fan is often used for cooling a device which has large internal resistance because of its ability to provide a high static pressure.

For addressing a reduction in noise in the projection display apparatus, JP-A-10-197953 discloses a technique of restraining noise with the provision of a lattice member which has a plurality of rectangular or circular openings on the upstream side of an air path remote from an exhaust fan. JP-A-2000-035614 in turn discloses a technique for restraining noise by a reticular rectifier attached to an end face which is located away from the leeward side which air passes through a heat sink. JP-A-2001-142147 further discloses a technique for restraining noise by attaching a silencer box formed with an air pass chamber through which air is exhausted.

JP-A-2005-62452 discloses a technique for eliminating fine adjustments to a lamp optical axis with the help of the structure of a reflector holding member. A lamp unit is provided with lamp cooling holes and an intake port. Cooling air introduced through the lamp cooling holes arranged in a radial configuration locally cools down the area that surrounds the cathode of a light source lamp. The cooling air introduced through the intake port cools down the periphery of a reflector, and is exhausted from an exhaust port of the reflector cover.

However, the related art techniques described above have the following problems.

The first problem is the increased noise value in a small projection display apparatus resulting from the need for rotating a plurality of mountable small axial flow fans in order to produce the amount of exhaust air required to cool the projection display apparatus which is equipped with a large heat source. While this problem is in part caused by lack of an absolute amount of air provided by a small fan at an ordinary rotational speed, the problem is also largely affected by use of both the project apparatus and the exhaust fan for cooling the lamp which generates a large amount of heat. Also, the rotation of the fan at high rotational speeds is likely to generate grating noise. Therefore, even when the noise level is reduced, the noise is heard as annoying because of its grating nature. Also, it is difficult to employ a silencer attached to the apparatus for restraining such noise, due to limitations in the size of the apparatus.

A second problem is difficulties in equipping a small projection display apparatus with a fan which has sufficient capabilities of cooling a lamp. This problem stems from the fact that although the only way to provide required static pressure with a small fan is to sacrifice a certain amount of air, the conventional lamp cooling method involves increasing static pressure for ensuring a flow velocity required for cooling the lamp, whereas the amount of air cannot be reduced for cooling down generated heat.

A third problem lies in that even in JP-A-2005-62452 which discloses a technique for eliminating fine adjustments to a lamp optical axis, all cooling air does not pass through the cooling holes or intake port, so that portions of the cooling air which do not pass through the cooling holes or intake port become substantially useless, thus failing to effectively make use of a large amount of air. This causes a problem of generating lauder noise, as in the case of the foregoing first problem.

SUMMARY OF THE INVENTION

It is an object of the present invention to provide a lamp unit which permits a small fan having a high static pressure to be used therein by reducing the amount of air required for cooling down a lamp. Consequently, the present invention provides a small projection display device which reduces the load on an exhaust fan for cooling a lamp, limits the rotational speed of the exhaust fan to keep the noise level low, and also restrains noise at grating frequencies.

A lamp unit of the present invention is fixed to an optical unit, and has a light source lamp and a reflector. The lamp unit is characterized by including a reflector holding member for holding the reflector, a positioner for positioning the reflector holding member to a stud provided in the optical unit, and having a throughhole for fixation of the reflector holding member to the stud, a cavity provided between the positioner and the reflector holding member in communication with the throughhole, and an opening provided in the reflector holding member for connecting the cavity with the interior of the reflector in which the light source lamp is mounted.

The lamp unit may further include a blower having a discharge port that is connected to the throughhole, and the blower may be provided with a noise isolation cover.

The opening may be provided at a position and in a direction such that cooling air flowing through the cavity blows out toward one or more predetermined locations of the light source lamp. The shape, area and number of the openings may be set in correspondence to a cooling condition at the predetermined location to which the cooling air is blown out through the openings.

The predetermined locations to which the cooling air is blown out through the openings may include an upper bulb area, a lower bulb area, and a cathode of the light source lamp, and may further include an upper hole area and a lower hole area which make up a throughhole of the reflector through which the light source lamp extends.

Another lamp unit of the present invention is fixed to an optical unit and has a light source unit and a reflector. The lamp unit is characterized by including a reflector holding member for holding the reflector, where the reflector holding member has at least one or more exhaust holes formed therethrough opposite to the reflector.

The lamp unit may include the exhaust hole formed through the reflector holding member that is connected to the internal cavity of a lamp unit positioner, and a positioner for positioning the reflector holding member which has a throughhole to a stud provided in the optical unit that has a throughhole, and for fixing the reflector holding member to the stud such that the throughhole is connected with the cavity. The exhaust hole of the reflector holding member is connected to the throughhole formed through the stud when the reflector holding member is fixed to the stud in order to connect the interior of the reflector with the outside of the lamp unit, thus permitting air within the reflector to be exhausted through the connected exhaust hole to the outside.

A projection display apparatus of the present invention includes the lamp unit described above.

The bulb of the light source lamp can be significantly cooled down by blowing cooling air to the light source lamp from the reflector holding member, using a lamp unit positioner of the reflector holding member as a passage for the cooling air, in the structure according to JP-A-2005-62452 which only has positioning and fixing functions.

The flow velocity of the fluid bursting force from each cooling hole can be controlled by setting different diameters and lengths for the plurality of cooling holes. Also, the flow velocity can be controlled at each cooled area by the difference in the number of cooling holes.

In the lamp unit of the present invention, cooling air can be concentratively sent to the bulb of the light source lamp, making use of the positioning structure of the reflector holding member for positioning the lamp unit with respect to the optical unit. Therefore, the air will not leak to areas which do not require cooling, so that the flow velocity required for the cooling can be ensured even with a very small amount of air to efficiently cool down the light source lamp. Also, since a ventilation hole is provided for the cooling air in the reflector holding member for positioning, the bulb can be efficiently cooled down simultaneously with the positioning.

Accordingly, a small high static pressure fan can be used for cooling down the light source lamp which generates a large amount of heat, thus enabling a reduction in the size of the display apparatus. Also, since the amount of air that is required to cool the overall apparatus can be limited, the rotational speed of the exhaust fan can be reduced to restrain the noise level and to reduce noise at grating frequencies.

The above and other objects, features and advantages of the present invention will become apparent from the following description with reference to the accompanying drawings which illustrate examples of a preferred embodiment of the present invention.

DETAILED DESCRIPTION OF THE PREFERRED EMBODIMENTS

Figure 4:
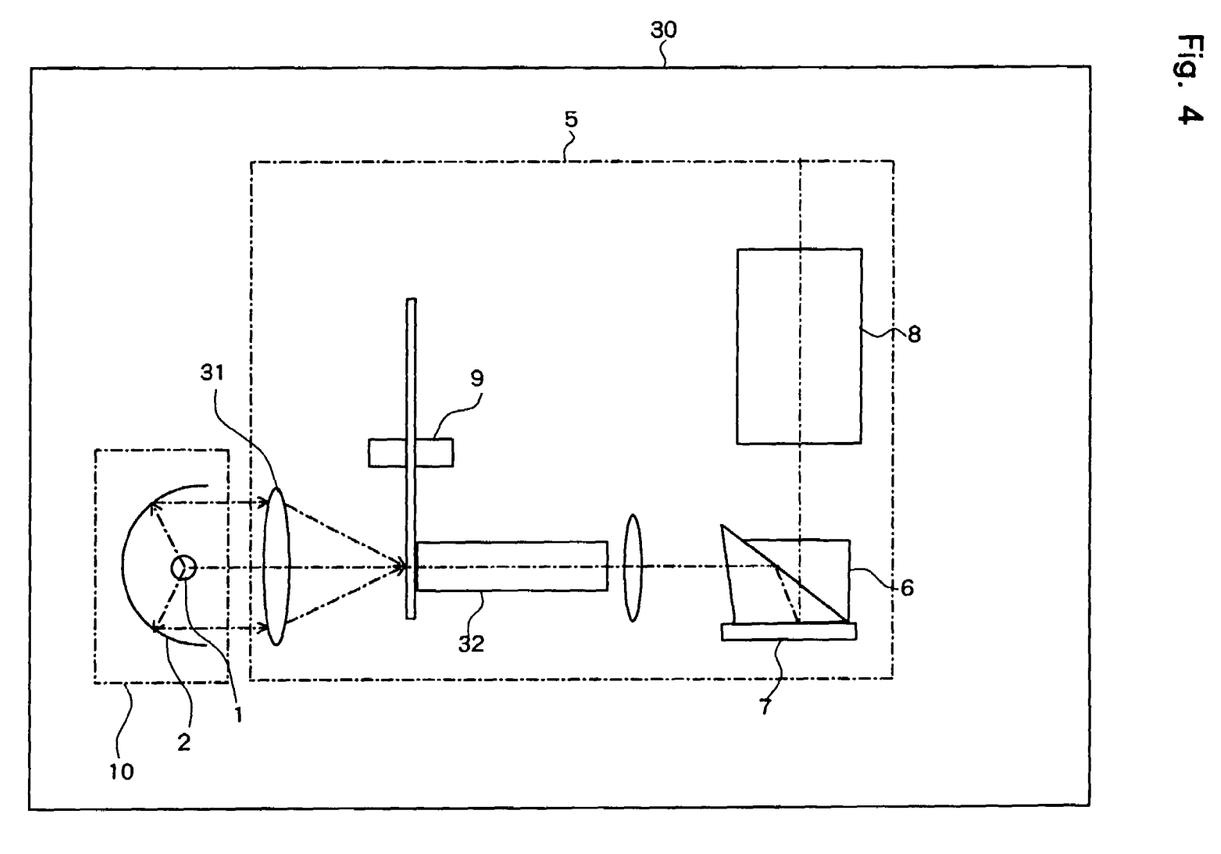
FIG. 4 is a schematic diagram illustrating the configuration of a lamp unit and an optical unit in a projection display apparatus.

In the following, a lamp unit and a projection display apparatus according to one embodiment of the present invention will be described in detail with reference to the accompanying drawings. As illustrated in FIG. 4, in projection display apparatus 30 of the present invention, light emitted from light source lamp 1 of lamp unit 10 is reflected by reflector 2, and focused by focusing lens 31 of optical unit 5 to one point on color wheel 9 which is made up of color filters for selectively passing therethrough red, green, and blue light, respectively. Light passing through color wheel 9 is uniformized by a light tunnel formed in a box of rod integrator 32, and has its optical path changed by a mirror. After the change in the optical path, illumination light is irradiated to DMD (digital micro device) 7 through TIR (Total Internal Reflection) prism 6. Image light, which is light reflected by DMD 7, is projected onto a screen, not shown, through zoom projection lens 8. While the image display apparatus is described in connection with the DMD, the lamp unit of the present invention can be similarly used for a liquid crystal display apparatus as well.

Figure 3:
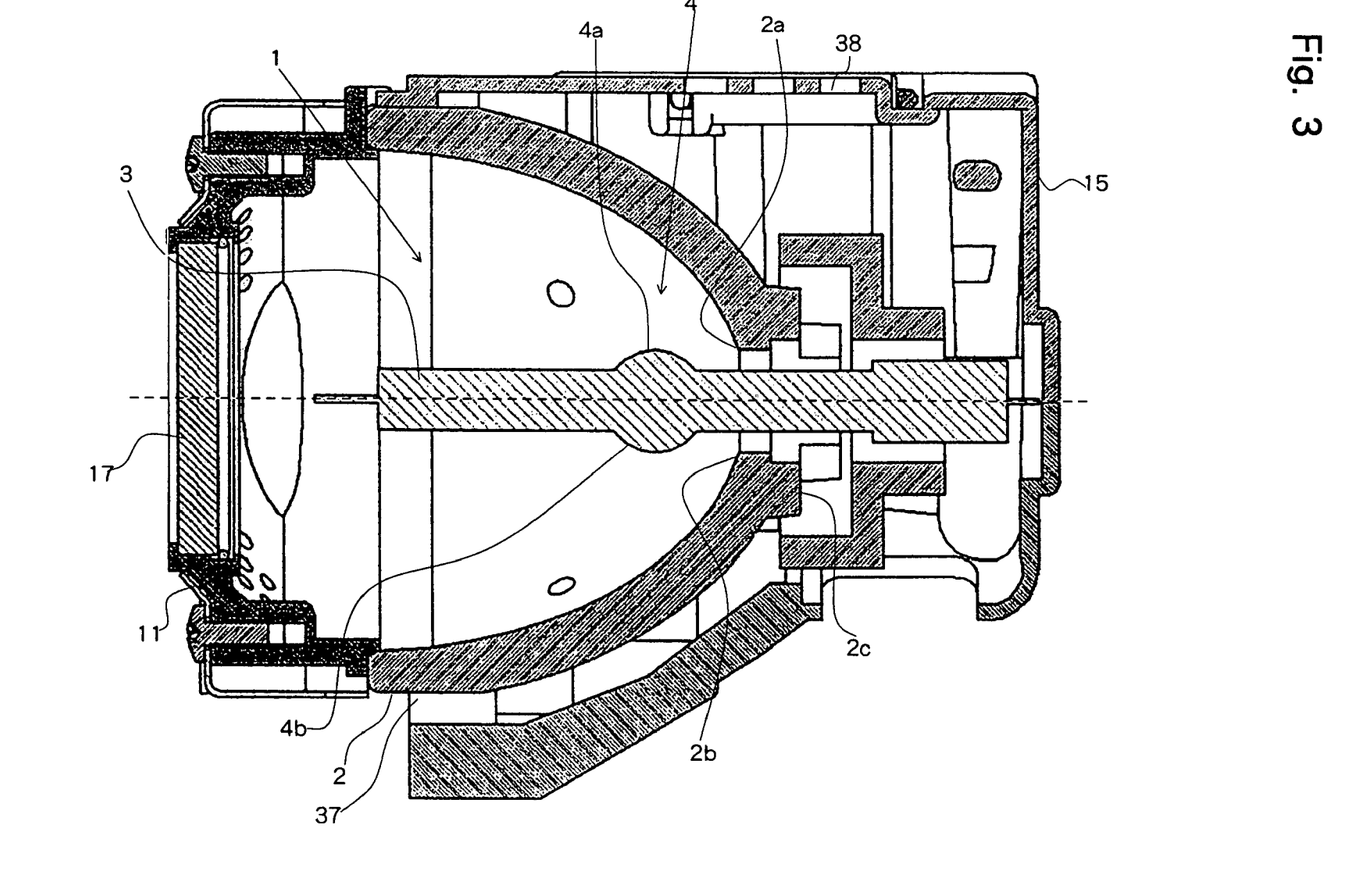
FIG. 3 is a cross-sectional view of the lamp unit in the embodiment of the present invention.

As illustrated in FIG. 3, lamp unit 10 comprises light source lamp 1, reflector 2 for reflecting light emitted from light source lamp 1 to converge the reflected light to a focal point, reflector holding member 11 to hold reflector 2 for positioning with respect to adjacent optical unit 5, reflector cover 15 to protect reflector 22 from the outside, and lamp connector 12 (FIG. 1) to supply electric power to light source lamp 1.

Figure 5:
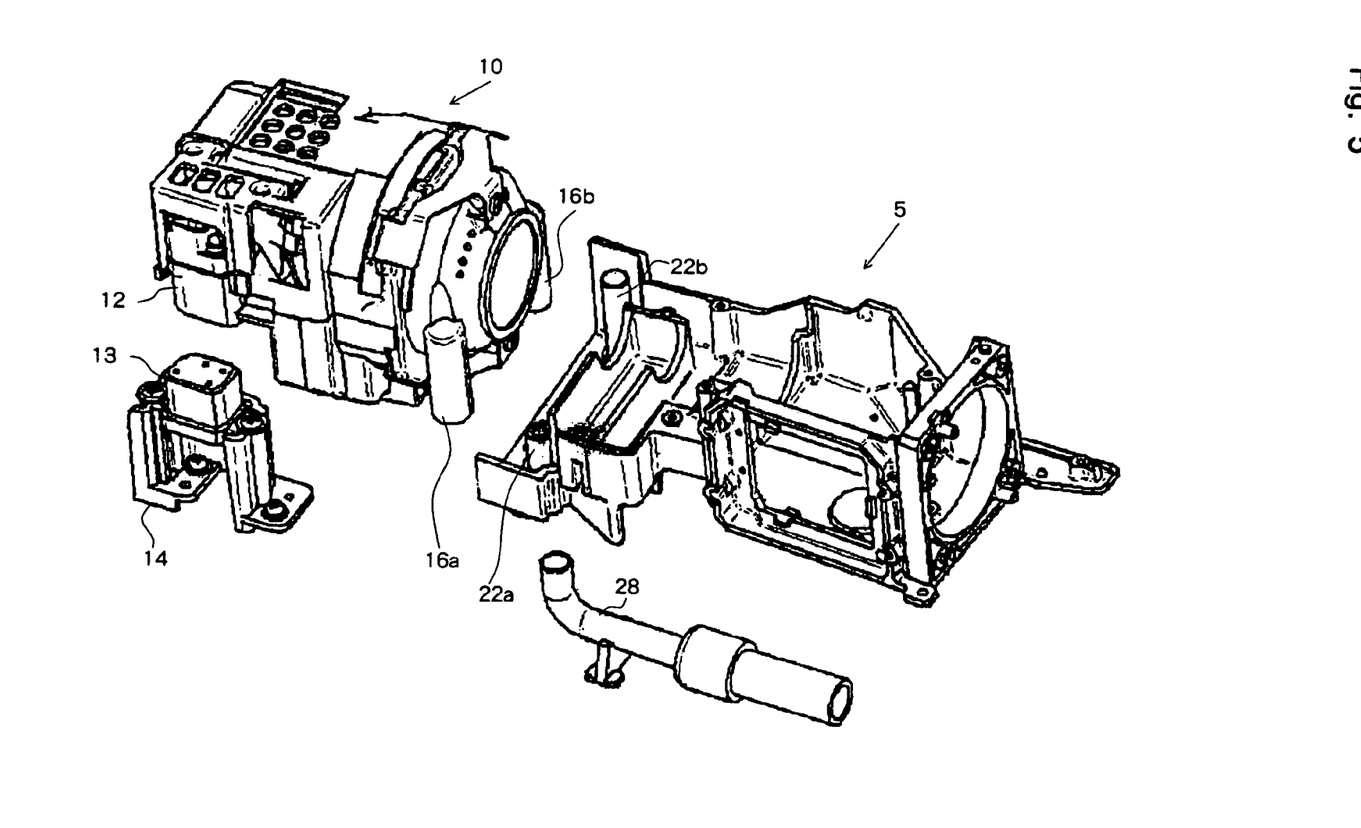
FIG. 5 is an exploded perspective view illustrating the relationship between the lamp unit and a framework of the optical unit in the projection display apparatus which is equipped with the lamp unit of the present invention.

As illustrated in FIG. 5, projection display apparatus 30 comprises power supply connector 13 electrically connected to lamp connector 12 of lamp unit 10 and held by power supply connector holder 14, and aforementioned optical unit 5 for receiving light flux from lamp unit 10 to project an image onto a projection plane.

Figure 1:
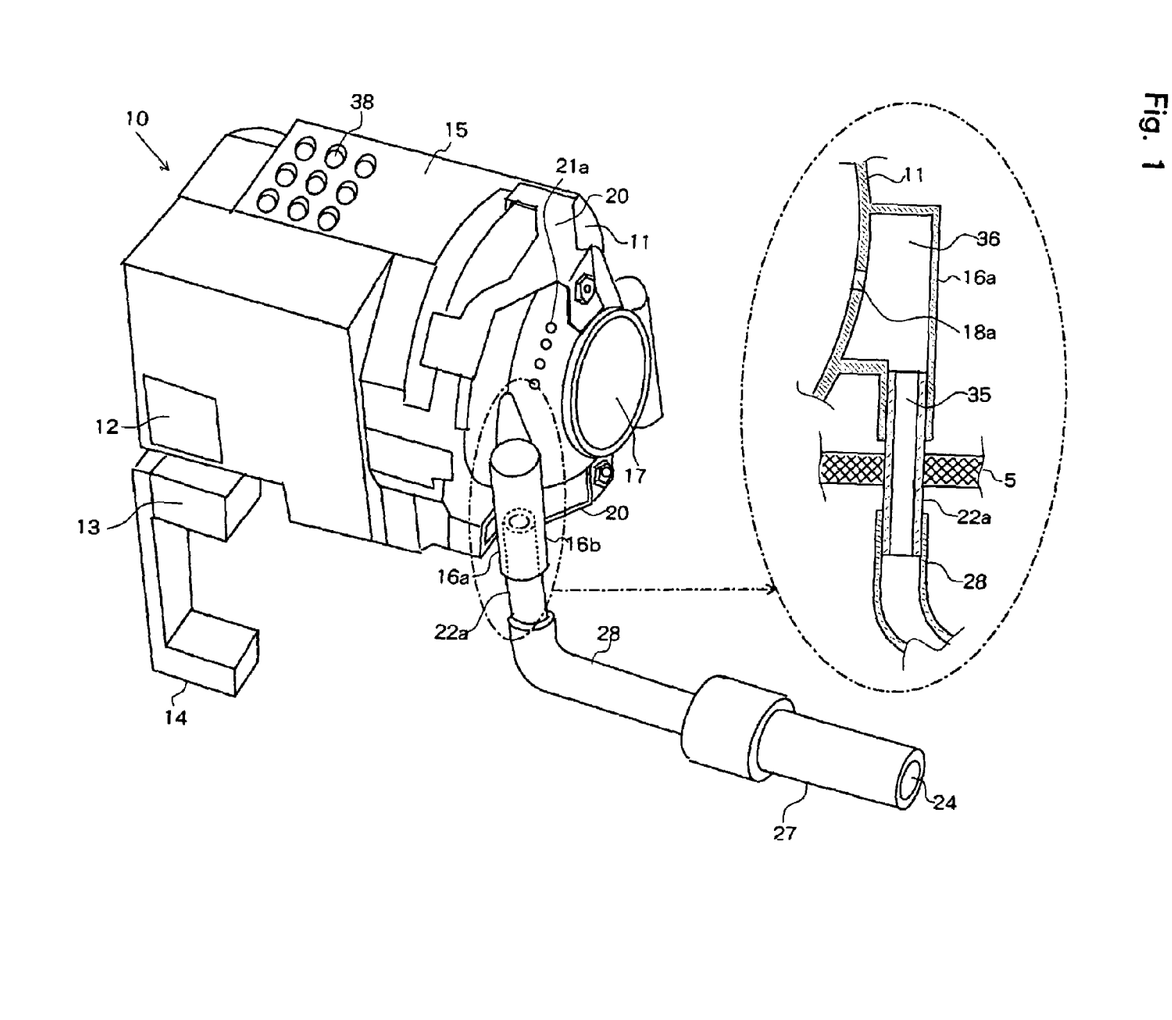
FIG. 1 is a schematic perspective view of a lamp unit according to one embodiment of the present invention.

Optical unit 5 is provided with stud 22a. As illustrated in FIG. 1, reflector holding member 11 is securely positioned by fitting a hole formed in lamp unit positioner 16 of reflector holding member 11 of lamp unit 10 onto the outer periphery of stud 22a. Throughhole 35 is formed inside stud 22a, and high static pressure blower 27 having intake section 24 is connected to the side of stud 22a that is opposite to the side to which positioner 16 is fixed, through tube 28 which connects to throughhole 35. Cavity 36 is formed between lamp unit positioner 16 and reflector holding member 11, extending from a hole formed through lamp unit positioner 16 for fixation with stud 22a.

Reflector 2 is fixed by pressing member 20 such that reflector 2 is sandwiched between an end face whose conical reflector holding member 11's diameter is larger and an end face of reflector cover 15. This is because reflector 2 and reflector holding member 11 are pressed against each other in the optical axis direction of light source lamp 1 by tabs formed on both sides of light source lamp 1 in the optical axis direction. In this way, reflector 2 is positioned with respect to optical unit 5 through reflector holding member 11, so that light flux projected from light source lamp 1 aligned to reflector 2 impinges on optical unit 5 in a correct direction.

A circular opening is open at the center of conical reflector holding member 11, and explosion-proof glass 17 made of Pyrex glass is fitted in the opening such that light flux reflected from reflector 2 is projected to the outside from this opening. Reflector holding member 11 is also formed with cavity 36 between reflector holding member 11 and lamp positioner 16a.

Figure 2:
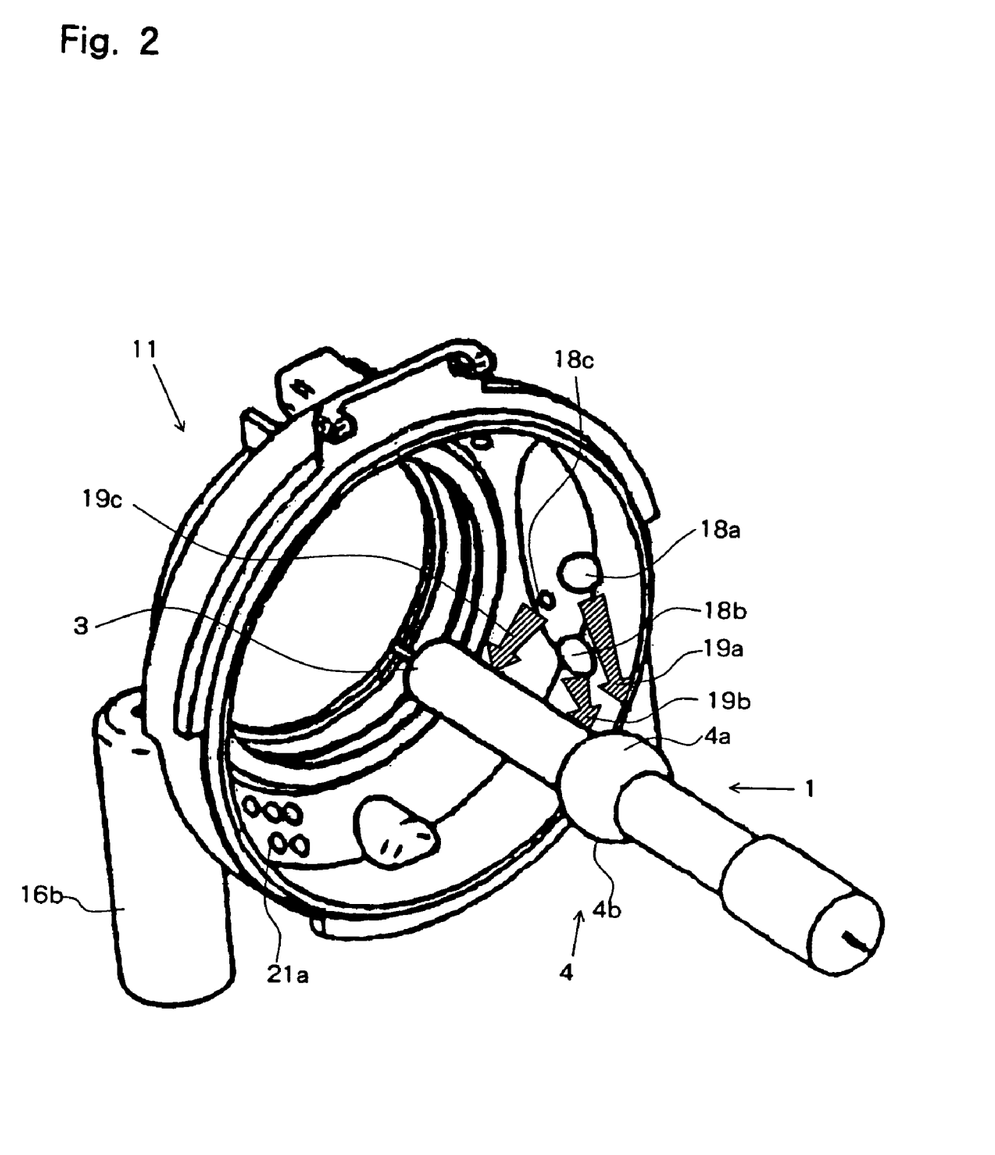
FIG. 2 is a schematic perspective view of a reflector holding member in the embodiment of the present invention.

As illustrated in FIG. 2, reflector holding member 11 facing cavity 36 is provided with cooling holes 18a, 18b, 18c for cooling light source lamp 1 placed within reflector 2. Cooling holes 18a, 18b, 18c are connected to a hole for fixing stud 22a through cavity 36 defined within lamp positioner 16a. Therefore, cooling air generated by high static pressure blower 27 passes through cavity 36 of lamp positioner 16a from throughhole 35 of stud 22a, and is blown out toward light source lamp 1 through cooling holes 18a, 18b, 18c.

This embodiment is characterized by cooling holes 18a, 18b, 18c which are opened radially toward upper bulb area 4a, lower bulb area 4b, and cathode 3 of light source lamp 1 shown in FIG. 3. In FIG. 2, cooling air 19a from cooling hole 18a is blown toward upper bulb area 4a in FIG. 3; cooling air 19b from cooling hole 18b toward lower bulb area 4b; and cooling air 19c from cooling hole 18c toward bulb cathode 3. Here, the cooling air is fed from high static pressure blower 27, but may be fed instead from a blower of optical unit 5 which also cools down other areas.

Figure 6:
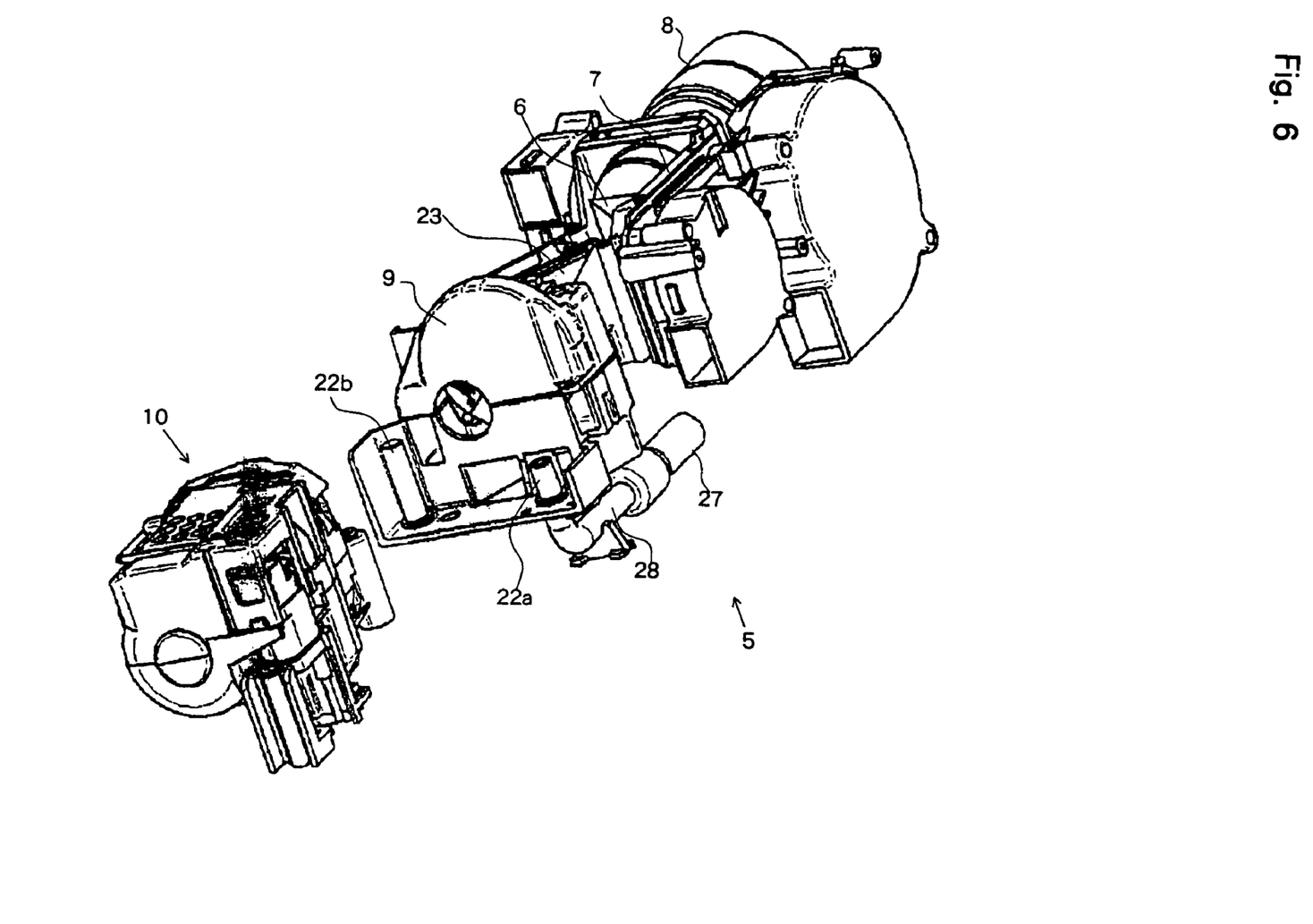
FIG. 6 is an exploded perspective view illustrating the optical unit from which the lamp unit is removed.

Next, the relationship between lamp unit 10 and optical unit 5 in projection display apparatus 30 according to this embodiment of the present invention will be described with reference to FIGS. 5 and 6 as a specific apparatus.

From a state illustrated in FIG. 5, lamp unit 10 is moved down substantially vertically from above toward optical unit 5 at a predetermined position to couple the two units. The holes formed in lamp unit positioners 16a, 16b attached to lamp unit 10 are fitted onto the outer peripheries of studs 22a, 22b provided in optical unit 5 to fix two units 5, 10. In this way, lamp unit positioners 16a, 16b are provided with holes in their lower ends to be fitted on the outer peripheries of studs 22a, 22b, respectively. Cavity 36 (FIG. 1) is formed between lamp unit positioner 16a and the body of reflector holding member 11, and the holes are connected to cavity 36. Cooling holes 18a, 18b, 18c are formed at predetermined positions on the surface of the body of reflector holding member 11 in contact with cavity 36 in a predetermined shape in orientation to predetermined directions, as illustrated in FIG. 2.

Stud 22a formed in optical unit 5 is formed with throughhole 35 (FIG. 1) for passing cooling air therethrough. Tube 28 is connected to an end of throughhole 35 opposite to the end engaged with lamp unit positioner 16a, and high static pressure blower 27 having intake section 24 is connected to the other end of tube 28. Here, high static pressure blower 27 is shown as an axial flow fan because of its small size and ability to provide a high static pressure, but high static pressure blower 27 is not limited to the axial flow fan but may be another fan.

Thus, cooling air from high static pressure blower 27 is sent to cavity 36 between lamp unit positioner 16a and the body of reflector holding member 11 through tube 28, throughhole 35 of stud 22a, and the engagement hole of lamp unit positioner 16a with stud 22a. The cooling air sent to cavity 36 blows into reflector 2 from cooling holes 18a, 18b, 18c formed at predetermined positions on the body of reflector holding member 11. As illustrated in FIG. 2, cooling air flows 19a, 19b, 19c blowing from cooling holes 18a, 18b, 18c are sent toward and cool down upper bulb area 4a, lower bulb area 4b, and cathode 3 of bulb 4 of light source lamp 1, respectively.

Lamp unit 10 has lamp connector 12 which is coupled to power supply connector 13 contained in the body of the projection display apparatus, such that light source lamp 1 is supplied with electric power through power supply connector 13.

A cooling mechanism for the lamp unit of this embodiment will be described in greater detail with reference to the drawings. As illustrated in FIG. 1, cooling air is sucked through intake section 24, and sent to throughhole 35 within stud 22a through tube 28 by high static pressure blower 27. From throughhole 35, cooling air is sent from cavity 36 of lamp unit positioner 16a of reflector holding member 11 coupled to stud 22a to the respective lamp areas of light source lamp 1 through cooling holes 18a, 18b, 18c formed through reflector holding member 11 as shown in FIG. 2. Since cooling holes 18a, 18b, 18c differ in diameter and length from one another, cooling air flows 19a, 19b, 19c are set at different flow velocities. Since the respective cooling holes are open toward upper bulb area 4a, lower bulb area 4b, and cathode 3, the cooling air flows can be concentratively blown onto the objects.

In order to sufficiently exploit the performance of light source lamp 1, the aforementioned areas of light source lamp 1 must be managed at appropriate temperatures. For this purpose, the flow rates of cooling air flows 19 are desirably set in an appropriate manner to maintain the areas at the respective temperatures. In the present invention, by providing a plurality of cooling holes 18a, 18b, 18c, and varying their inner diameter or shape, the respective cooling holes can blow out cooling air flows at different flow velocities, respectively, to cool down the areas associated with them, thus making it possible to manage the respective areas at appropriate temperatures. Also, since cooling air from high static pressure blower 27 is fed only through cooling holes 18a, 18b, 18c, cooling air will not leak to areas which do not require cooling. Accordingly, light source lamp 1 can be efficiently cooled down with a very small amount of cooling air flows 19a, 19b, 19c. It can be said that this is the largest effect of using cooling holes 18.

The relationship among the flow rate, flow velocity, and sending area is expressed by:

Flow Rate=Flow Velocity×Area

Therefore:

$$Q = s1 \times v1 + s2 \times v2 + s3 \times v3$$

where s1, s2, s3 are inner cross-sections of cooling holes 18a, 18b, 18c; v1, v2, v3 are flow velocities; and Q is the flow rate of high static pressure blower 27. The use of cooling holes permits a reduction in the blow-out inner cross-section of the cooling air, so that the flow velocity can be increased even with a small amount of air. If a light source lamp was cooled down without using cooling holes, a flow path would spread over gaps around the light source lamp to increase the area of the flow path and reduce the flow velocity, resulting in reduced cooling efficiency even with the same amount of air.

While FIG. 2 shows cooling holes 18a, 18b, 18c at only three locations, a plurality of cooling holes may be provided for a single object under cooling in accordance with required cooling performance. Further, cooling holes 18 are effectively opened as required toward upper hole area 2a, lower hole area 2b and the like near the gap between a portion of reflector 2 through which light source lamp 1 extends, and light source lamp 1 shown in FIG. 3. This is effective for varying the cooling effect on the bulb temperature and hole temperature.

Also, while throughhole 35 is formed only through one stud 22a in the foregoing embodiment, throughhole 35 may also formed through stud 22b as required in the same manner and may be coupled to tube 28 which branches from high static pressure blower 27. The number of cooling holes 18 can be increased by additionally forming communicating cavity 36 in lamp unit positioner 16b, and piercing cooling holes 18 through reflector holding member 11 as well, thereby optimizing the temperature in each area. In this event, high static pressure blowers 27 may be provided in correspondence to respective lamp unit positioners 16a, 16b on a one-by-one basis.

The air which has cooled down light source lamp 1 is exhausted out of lamp unit 10 from exhaust hole 21a formed through reflector holding member 11 shown in FIG. 2.

Also, cooling air, sucked through intake port 37 between reflector cover 15 and reflector 2 in FIG. 3 in a manner similar to the related art example, cools down the areas surrounding reflector 2, and is induced by an exhaust fan, not shown, and exhausted from exhaust port 38 formed through reflector cover 15 to the outside. However, a reduced load is required for cooling down light source lamp 1 by this cooling air.

Figure 7:
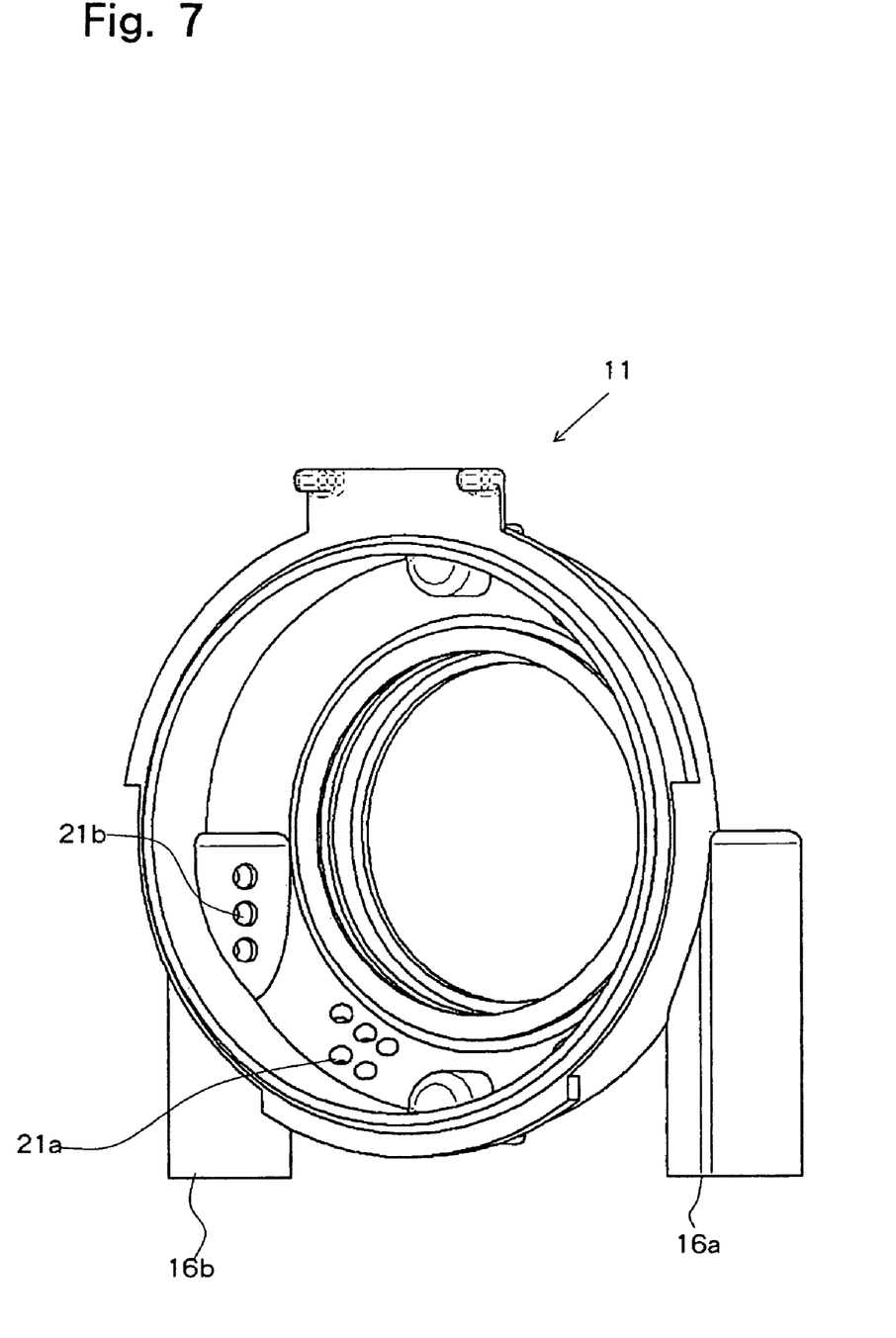
FIG. 7 is a schematic perspective view illustrating a reflector holding member in an exemplary application of the embodiment.

As illustrated in FIG. 7, cavity 36, not shown, may be provided between reflector holding member 11 and lamp unit positioner 16b, exhaust hole 21b may be located at a position facing cavity 36 of reflector holding member 11, and a throughhole may be opened at the center of stud 22b (FIG. 5). With this structure, cooling air can be exhausted from below stud 22b in addition to being exhausted through ordinary exhaust hole 21a. Also, while means to exhaust cooling air through exhaust hole 21b and the throughhole of stud 22b may be provided alone, an additional means to exhaust cooling air may be provided in lamp unit positioner 16a opposite to aforementioned lamp unit positioner 16b if cooling air can be supplied by another method.

Figure 8:
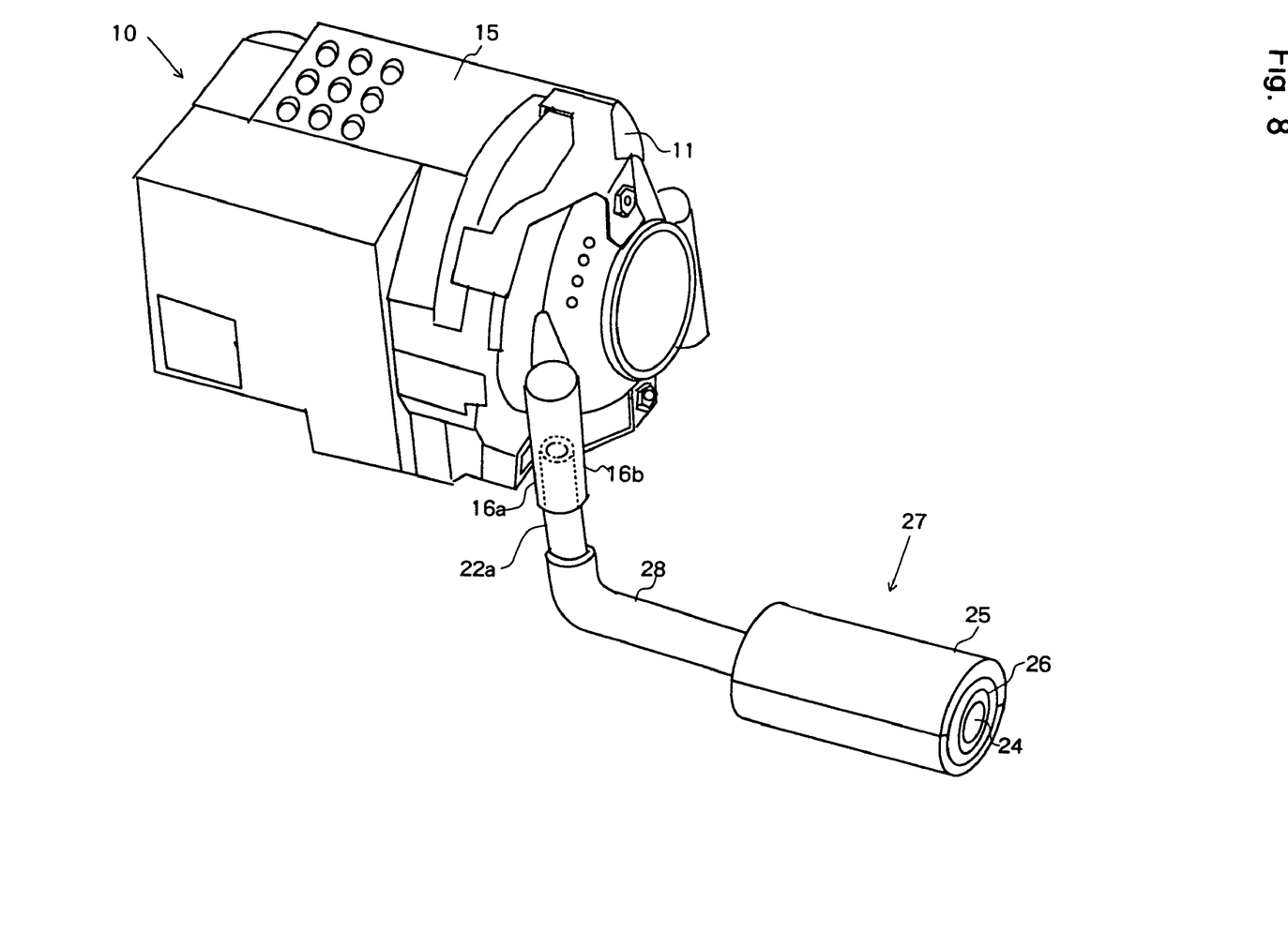
FIG. 8 is a schematic perspective view of a lamp unit in an exemplary application of the embodiment.

FIG. 8 is a schematic perspective view of a lamp unit in an exemplary application of this embodiment. In the configuration of this embodiment, light source lamp 1 can be cooled down with a very small amount of air, thus permitting a reduction in the diameter of high static pressure blower 27 and the intake port of intake section 24. As a result, high static pressure blower 27 can be covered with noise absorbing material 26 and sound isolation cover 25, as illustrated in FIG. 8, to further reduce noise generated from high static pressure blower 27.

Since projection display apparatus 30 of the present invention employs lamp unit 10, because the amount of air that is required to cool down light source lamp 1 can be reduced, according to the present invention, high static pressure and a small fan can be used. Also, a smaller load can be placed on the exhaust fan of projection display apparatus 30 to send a reduced amount of air for cooling down the lamp, and therefore the rotational speed can be reduced in order to keep the noise level low and restrain the generation of noise at grating frequencies.

While preferred embodiments of the present invention have been described using specific terms, such description is for illustrative purposes only, and it is to be understood that changes and variations may be made without departing from the spirit or scope of the following claims.

What is claimed is:

1. A lamp unit fixed to an optical unit and having a light source lamp and a reflector, said lamp unit comprising:
    a reflector holding member for holding said reflector;
    a positioner for positioning said reflector holding member to a stud provided in said optical unit, and having a throughhole for fixation of said reflector holding member to said stud;
    a cavity provided between said positioner and said reflector holding member connected to the throughhole; and
    a plurality of cooling holes provided in said reflector holding member for connecting said cavity with an interior of said reflector in which said light source lamp is mounted, said plurality of cooling holes each having different inner cross-sections from one another, and having different flow velocities of cooling air from one another,
    wherein said plurality of cooling holes are provided at a position and in a direction such that cooling air flowing through said cavity blows out toward one or more predetermined locations of said light source lamp,
    wherein said predetermined locations to which the cooling air blows out through said plurality of cooling holes include an upper bulb area, a lower bulb area, and a cathode of the light source lamp, and
    wherein each of said plurality of cooling holes open toward said upper bulb area, said lower bulb area, and said cathode of the light source lamp.

2. The lamp unit according to claim 1, further comprising a blower having a discharge port connected to the throughhole.

3. The lamp unit according to claim 2, further comprising a noise isolation cover provided for said blower.

4. The lamp unit according to claim 1, wherein said plurality of cooling holes have a shape and an area which are set in correspondence to a cooling condition at the predetermined location to which the cooling air blows out.

5. The lamp unit according to claim 1, wherein said plurality of cooling holes are provided in correspondence to a cooling condition at the predetermined locations to which the cooling air blows out through said cooling holes.

6. The lamp unit according to claim 1, wherein said predetermined locations to which the cooling air blows out through said plurality of cooling holes further include an upper hole area and a lower hole area which make up a throughhole of said reflector through which said light source lamp extends.

7. The lamp unit according to claim 1, wherein said reflector holding member comprises at least an exhaust hole formed therethrough opposite to said reflector.

8. The lamp unit according to claim 7, wherein said exhaust hole formed through said reflector holding member is connected to said cavity,
   wherein said cavity is defined within said positioner, and
   wherein said positioner fixes said reflector holding member to said stud such that the throughhole connects to said cavity.

9. The lamp unit according to claim 8, wherein said exhaust hole of said reflector holding member is connected to the throughhole formed through said stud when said reflector holding member is fixed to said stud to connect the interior of said reflector with an outside of said lamp unit.

10. A projection display apparatus, comprising:
    an optical unit; and
    a lamp unit fixed to said optical unit, said lamp unit comprising:
        a reflector holding member that holds a reflector, an interior of said reflector comprising a light source lamp;
        a positioner that positions said reflector holding member to a stud provided in said optical unit, said positioner comprising a throughhole that fixes said reflector holding member to said stud;
        a cavity provided between said positioner and said reflector holding member, said cavity connected to said throughhole; and
        a plurality of cooling holes provided in said reflector holding member at a position and in a direction such that cooling air flowing through said cavity exhausts toward at least one predetermined location of said light source lamp, said at least one predetermined location comprising an upper bulb area, a lower bulb area, and a cathode of said light source lamp, said plurality of cooling holes opening toward said upper bulb area, said lower bulb area, and said cathode of said light source lamp, said plurality of cooling holes having different inner cross-sections and different flow velocities of cooling air, and connecting said cavity with said interior of said reflector.

11. The projection display apparatus according to claim 10, wherein said optical unit comprises:
    a focusing lens that focuses a source light emitted from said light source lamp;
    a color wheel comprising:
        a point on which said focusing lens focuses said source light emitted from said light source lamp; and
        a plurality of color filters, said source light selectively passing through at least one of said plurality of color filters of said color wheel;
    a box of a rod integrator comprising a light tunnel which uniformizes said source light passing through said color wheel; and
    a digital micro device (DMD) to which said source light is irradiated through a prism after uniformization within said light tunnel.

12. The projection display apparatus according to claim 10, wherein said reflector is positioned with respect to said optical unit through said reflector holding member such that a light flux projected from said light source lamp aligned to said reflector impinges on said optical unit in a correct direction.

13. The projection display apparatus according to claim 10, wherein said optical unit and said lamp unit are coupled by moving said lamp unit down substantially vertically from above toward said optical unit at a predetermined position.

14. The projection display apparatus according to claim 10, wherein said throughhole is fitted onto an outer periphery of said stud provided in said optical unit to fix said optical unit and said lamp unit.

* * * * *